United States Patent Office 3,035,858
Patented May 22, 1962

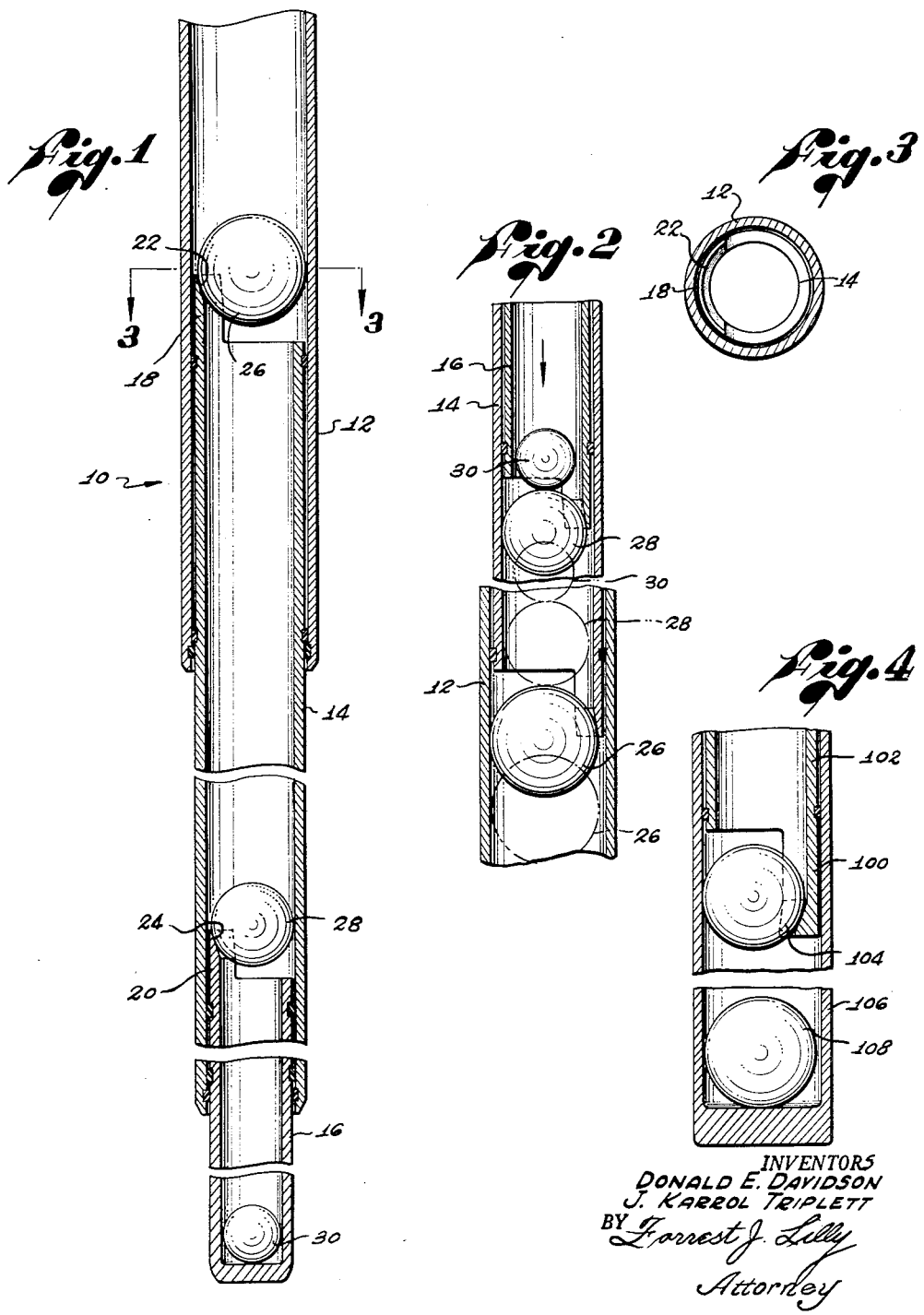

3,035,858
FRICTION LOCK FOR TELESCOPING TUBES
Donald E. Davidson, La Habra, and J Karrol Triplett, Sierre Madre, Calif., assignors to Davidson Optronics, Inc., West Covina, Calif., a corporation of California
Filed Mar. 14, 1960, Ser. No. 14,640
7 Claims. (Cl. 287—58)

This invention relates to a friction lock for telescoping tubes and has as its general object to provide a new and unique friction lock for releasably locking telescoping tubes against relative axial movement.

A more specific object of the invention is to provide a friction lock of the character described which is set by placing the telescoping tubes in an upright position and released by placing the tubes in an inverted upright position.

Another object of the invention is to provide a friction lock of the character described which is ideally suited for use in telescoping tripod legs and the like.

A further object of the invention is to provide a friction lock of the character described which is relatively simple in construction, inexpensive to manufacture, relatively immune to wear and malfunctioning and otherwise especially well suited to its intended purposes.

Other objects, advantages and features of the invention will become readily apparent as the description proceeds.

Briefly, these objects are attained by providing a telescoping tube assembly wherein each inner tube has an associated locking element which is movable to and from a locking position of wedging engagement between an axial extension at one end of its associated tube and the wall of the next larger tube to lock the tubes against and release the tubes for telescoping movement. The tubes are locked against such movement simply by placing the tube assembly in an upright position so that the locking elements drop to their locking positions under the action of gravity.

One aspect of this invention is concerned with certain unique features of construction of this friction lock. A second aspect of the invention is concerned with a unique lock releasing means. Briefly, this releasing means comprises a hammer element in one end tube which knocks the adjacent locking element from its locking position when the tubes are inverted to initiate a chain reaction in which each locking element, when released, knocks the next lower locking element from its locking position.

A better understanding of the invention may be had from the following detailed description thereof taken in connection with the annexed drawing, wherein:

FIG. 1 is a longitudinal section through the present telescoping tube assembly with the several friction locks set to lock the tubes of the assembly against inward telescoping movement;

FIG. 2 is a view similar to FIG. 1 showing how the friction locks are released;

FIG. 3 is a section taken along line 3—3 of FIG. 1; and

FIG. 4 illustrates a modified form of friction lock to hold telescoping tubes against axial separation.

The telescoping tube assembly 10 illustrated in FIGS. 1-3 of this drawing comprises an outer tube 12 and inner tubes 14 and 16. The tube assembly has been illustrated as comprising only three tubes since this number is adequate to explain the invention. It will become clear as the description proceeds, however, that the assembly may embody only two tubes or any number of tubes greater than three.

The upper ends of the inner tubes 14 and 16 are cut away or axially relieved at one side to form at the other sides of the tubes cylindrically curved axial extensions 18 and 20. The end of each extension 18 and 20 is beveled at its inner side, as indicated at 22 and 24, so that each extension is, in effect, an axially tapered cam.

Contained within the tube assembly 10 are a pair of locking elements 26 and 28 and a lock releasing or hammer element 30. These elements preferably comprise steel balls, as shown. It will become apparent as the description proceeds, however, that elements having other configurations may be used.

Locking element or ball 26 is proportioned to be freely movable within the outer sleeve 12 and to have a wedging fit between the axially tapered extension 18 on the tube 14 and the wall of tube 12. Similarly, locking element or ball 28 is proportioned to be freely movable within the tube 14 and to have a wedging fit between the tapered extension 24 on the tube 16 and the wall of tube 14. The hammer element or ball 30 is proportioned to be freely movable within the innermost tube 16.

Accordingly, each locking element or ball is proportioned to be freely movable within one of the several tubes of the assembly and to have a wedging fit between the wall of its associated tube and the axially tapered extension on the next smaller tube. These positions of wedging engagement of the locking elements between the tapered extensions and tube walls are the locking positions of the balls. That is to say, when the locking elements occupy their locking positions, the several tubes are frictionally locked against telescoping movement. The telescoping tube assembly 10 is locked against such telescoping movement of its tubes by simply placing it in an upright position so that the locking elements drop to their locking positions under the action of gravity.

One way in which the tubes 10 may be released for telescoping movement is by pulling them apart, which action has the effect of releasing the locking elements from their locking positions. As mentioned earlier, however, one aspect of the present invention is concerned with a unique means to release the several tubes of the assembly for telescoping movement when the assembly is placed in an inverted position. This release of the assembly is accomplished by means of the locking element or hammer 30 within the innermost tube 16. The hammer element is proportioned to be freely movable within the tube 16. When the telescoping tube assembly 10 is inverted with the locking elements 26 and 28 in their locking positions, the hammer element 30 drops under the action of gravity and knocks the then uppermost locking element 28 from its locking position. The locking element 28 then drops under the action of gravity and knocks the remaining locking element 26 from its locking position to release the tubes 12, 14 and 16 for telescopic movement. From this description, it is evident that when the tube assembly is inverted, the hammer element 30 initiates a chain reaction in which each locking element, when released, knocks the next lower locking element from its locking position so that the several locking elements are successively released.

The locking means just described serve to lock the telescoping tubes against inward telescoping movement. FIG. 4 illustrates a modification of the invention which is designed to releasably lock the telescoping sleeves against pulling apart. In this case, the axial cam or extension 100 on each telescoping tube 102 is tapered in just the reverse fashion from that described earlier, as shown. The ball 104 within each tube is proportioned to be freely movable within the tube and to have a wedging fit between the tapered extension 100 and the side wall of the next larger tube. With this arrangement, it is obvious that when the ball 104 is in its locking position, the telescoping tubes are locked against axial separation.

In the modified tube assembly, the outermost tube 106 contains the hammer or lock releasing element 108. When the tubes are placed in an upright position in which the outermost tube is at the top of the assembly, this hammer element drops under the action of gravity and knocks the adjacent locking element 104 from its locking position. This initiates successive release of all of the remaining locking elements in the tube assembly, in the manner already described.

It will now be clear that the locking elements and hammer element embodied in the telescoping tube assembly may comprise other than balls, as disclosed for illustrative purposes. For example, these elements might comprise cylinders with rounded ends. Numerous other modifications are, of course, possible within the spirit and scope of the appended claims.

There has, therefore, been described a telescoping sleeve lock which is fully capable of attaining the objects and advantages preliminarily set forth.

What is claimed is:

1. A telescopic tube assembly, comprising a pair of telescoping tubes, an axially tapered extension on one end of the inner tube, a locking element which is movable under the action of gravity to a locking position of wedging engagement between said extension and the wall of the outer tube when said tubes are placed in an upright position, said tubes being frictionally locked against telescopic movement when said element occupies said locking position, and a hammer element in one of said tubes which is movable under the action of gravity to knock the locking element from its locking position when the tubes are placed in an inverted position.

2. A telescopic tube assembly, comprising a plurality of telescoping tubes, an axially tapered extension on the end of each inner tube proximate to a given end of the outermost tube, a plurality of locking elements which are movable under the action of gravity to locking positions of wedging engagement between the tapered extensions and walls of adjacent tubes when the tubes are placed in an upright position in which one end of the outer tube is up, the tubes being frictionally locked against telescopic movement when said locking elements are in their locking positions, and a lock releasing hammer element within one end tube which is movable under the action of gravity to knock the adjacent locking element from its locking position when the tubes are placed in an inverted position to initiate a chain reaction in which each locking element knocks the next lower locking element from its locking position.

3. A telescopic tube assembly, comprising a plurality of telescoping tubes adapted to occupy a normally upright position, the upper end of each inner tube being axially relieved to form an axial extension at one side of the upper end of each inner tube, each extension being axially tapered, a locking element within each tube except the innermost tube, each element being proportioned to be freely movable in its respective tube and to have a wedging engagement between the axially tapered extension on the next smaller tube and the wall of the tube containing the element, said elements being movable under the action of gravity to locking positions of wedging engagement between the extensions and walls of the tubes when the latter are placed in their normally upright position to frictionally lock the tubes against telescopic movement, and a freely movable lock releasing element in the innermost tube which is movable into impact with the adjacent locking element to knock the latter from its locking position when the tubes are placed in an inverted position and to initiate a chain reaction in which each locking element when released impacts the next lower locking element to release it from its locking position.

4. A telescopic tube assembly, comprising a plurality of normally upright telescoping tubes, the normally upper end of each tube being relieved at one side to provide at the opposite side of the respective tubes a cylindrically curved, axial extension, said extensions being axially tapered, a ball within each tube except the innermost tube proportioned to move freely in its respective tube and to have a wedging fit between the axially tapered extension on the next smaller tube and the wall of the tube containing the respective ball, the tubes being locked against telescopic movement when said balls are in locking positions of wedging engagement between the extensions and tube walls, and a releasing element in the innermost tube for knocking the adjacent ball from its locking position when the tubes are inverted to initiate a chain reaction in which each ball knocks the next lower ball from its locking position.

5. A telescopic tube assembly comprising a pair of telescoping tubes, one end of the inner tube being cut away at one side to provide at the opposite side of the inner tube a cylindrically curved axial extension integrally joined at one end to the inner tube, the concave inner surface of said extension inclining inwardly toward the axis of the tubes as the surface approaches the other end of the extension, and a locking ball in the inner tube movable to and from a locking position of wedging engagement between said surface and the wall of the outer tube opposite the surface, wherein the tubes are frictionally locked against telescopic movement.

6. A telescopic tube assembly comprising a pair of telescoping tubes, one end of the inner tube being cut away at one side to provide at the opposite side of the inner tube a cylindrically curved axial extension integrally joined at one end to the inner tube, the concave inner surface of said extension inclining inwardly toward the axis of the tubes as the surface approaches the other end of the extension, a locking ball in the inner tube movable to a locking position of wedging engagement between said surface and the wall of the outer tube opposite the surface, wherein the tubes are frictionally locked against telescopic movement, when said tubes are placed in an upright position wherein said one end of the inner tube is lowermost, and a hammer element in the outer tube opposite said one end of the inner tube which is movable under the action of gravity to knock said ball from its locking position when the tubes are placed in an inverted position.

7. A telescopic tube assembly comprising a plurality of telescoping tubes adapted to occupy a normally upright position, the lower end of each inner tube being axially relieved to form an axial extension at one side of the lower end of each inner tube, each extension having an inner concave surface which inclines inwardly toward the axis of the tubes as the respective surface approaches the lower end of its respective extension, a locking element within each tube except the outermost tube, each element being proportioned to be freely movable in its respective tube and to have a locking position of wedging engagement between the inclined extension surface on its respective tube and the wall of the next larger tube, said elements being movable under the action of gravity to their locking positions when the tubes are placed in their normally upright position to frictionally lock the tubes against telescopic movement, and a freely movable lock releasing element in the outermost tube which is movable into impact with the adjacent locking element to knock the latter from its locking position when the tubes are placed in an inverted position whereby to initiate a chain reaction in which each locking element when released impacts the next lower locking element to release it from its locking position.

References Cited in the file of this patent

UNITED STATES PATENTS

| | | |
|---|---|---|
| 389,005 | Peck | Sept. 4, 1888 |
| 1,485,092 | Rauchut | Feb. 26, 1924 |
| 1,620,913 | Orwig | Mar. 15, 1927 |
| 2,447,107 | Wirgin | Aug. 17, 1948 |
| 2,747,824 | Darnell | May 29, 1956 |